(12) United States Patent
West et al.

(10) Patent No.: US 7,581,401 B2
(45) Date of Patent: Sep. 1, 2009

(54) METHODS AND APPARATUS FOR COOLING GAS TURBINE ENGINE COMPONENTS

(75) Inventors: James Anthony West, Simpsonville, SC (US); Gilbert Otto Kraemer, Greer, SC (US); David Martin Johnson, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 11/227,600

(22) Filed: Sep. 15, 2005

(65) Prior Publication Data
US 2007/0234729 A1    Oct. 11, 2007

(51) Int. Cl.
    F02C 6/00    (2006.01)
(52) U.S. Cl. .................. 60/772; 60/39.182; 60/806
(58) Field of Classification Search .......... 60/39.182, 60/39.54, 39.58, 772, 775, 806, 39.12
    See application file for complete search history.

(56) References Cited

U.S. PATENT DOCUMENTS

| | | | |
|---|---|---|---|
| 5,340,274 A * | 8/1994 | Cunha | 415/115 |
| 5,406,786 A * | 4/1995 | Scharpf et al. | 60/775 |
| 6,298,656 B1 | 10/2001 | Donovan et al. | |
| 6,351,938 B1 | 3/2002 | Kerrebrock | |
| 6,386,825 B1 | 5/2002 | Burdgick | |
| 6,389,793 B1 | 5/2002 | Priestley | |
| 6,481,212 B2 | 11/2002 | Priestley | |
| 6,487,863 B1 * | 12/2002 | Chen et al. | 60/806 |
| 6,584,779 B2 | 7/2003 | Priestley | |
| 2001/0039794 A1 | 11/2001 | Rocklin et al. | |
| 2004/0101400 A1 | 5/2004 | Maguire et al. | |
| 2005/0268619 A1 | 12/2005 | Ress, Jr. | |

FOREIGN PATENT DOCUMENTS

JP    8-218891    *    8/1996

* cited by examiner

Primary Examiner—Louis J Casaregola
(74) Attorney, Agent, or Firm—Armstrong Teasdale LLP (57) ABSTRACT

A method for cooling a turbine assembly component of a gas turbine engine in a combined-cycle power generation system. The method includes channeling cooling fluid that is extracted from a source external to the gas turbine engine to the turbine assembly component, and cooling the turbine assembly component using the cooling fluid.

9 Claims, 7 Drawing Sheets

METHODS AND APPARATUS FOR COOLING GAS TURBINE ENGINE COMPONENTS

BACKGROUND OF THE INVENTION

This invention relates generally to integrated gasification combined-cycle (IGCC) power generation systems, and more specifically to methods and apparatus for cooling gas turbine engine components in IGCC systems.

At least some known IGCC systems include a gasification system that is integrated with at least one power producing turbine system. For example, known gasifiers convert a mixture of fuel, air or oxygen, steam, and/or limestone into an output of partially combusted gas, sometimes referred to as "syngas". The hot combustion gases are supplied to the combustor of a gas turbine engine, which powers a generator that supplies electrical power to a power grid. Exhaust from at least some known gas turbine engines is supplied to a heat recovery steam generator that generates steam for driving a steam turbine. Power generated by the steam turbine also drives an electrical generator that provides electrical power to the power grid.

At least some known gasification processes may generate flows of nitrogen. For example, an air separation unit used to generate and supply oxygen to the gasifier may generate oxygen by separating nitrogen and oxygen from a supply of air. Some of the nitrogen may be used to facilitate controlling emissions generated by the gas turbine engine. For example, nitrogen may be injected into the combustion zone of the gas turbine engine to reduce combustion temperatures, and to reduce nitrous oxide emissions from the gas turbine engine. However, even if some nitrogen is used for emissions control, some excess nitrogen may still be generated. Excess nitrogen is typically vented from known IGCC systems to the atmosphere.

BRIEF DESCRIPTION OF THE INVENTION

In one aspect, a method is provided for cooling a turbine assembly component of a gas turbine engine in a combined-cycle power generation system. The method includes channeling cooling fluid that is extracted from a source external to the gas turbine engine to the turbine assembly component, and cooling the turbine assembly component using the cooling fluid.

In another aspect, a combined-cycle power generation system includes a gas turbine engine including a turbine assembly, and an air separation unit configured to separate oxygen and nitrogen process gas from air to thereby generate a flow of nitrogen process gas and a flow of oxygen. The air separation unit includes a nitrogen outlet that exhausts nitrogen process gas from the air separation unit. The system also includes a conduit coupled in flow communication to the nitrogen outlet and coupled in flow communication to the turbine assembly. The conduit is configured to channel nitrogen process gas discharged from the nitrogen outlet to the turbine assembly to facilitate cooling a component within the turbine assembly.

In another aspect, a combined-cycle power generation system includes a gas turbine engine comprising a turbine assembly, a gasifier configured to generate fuel for use by the gas turbine engine, and a clean-up device configured to separate carbon dioxide from the fuel generated by the gasifier. The clean-up device includes a carbon dioxide outlet that exhausts a flow of carbon dioxide from the clean-up device. The system also includes a conduit coupled in flow communication to the carbon dioxide outlet and coupled in flow communication to the turbine assembly. The conduit is configured to channel carbon dioxide discharged from the carbon dioxide outlet to the turbine assembly to facilitate cooling a component within the turbine assembly.

DETAILED DESCRIPTION OF THE INVENTION

Figure 1:
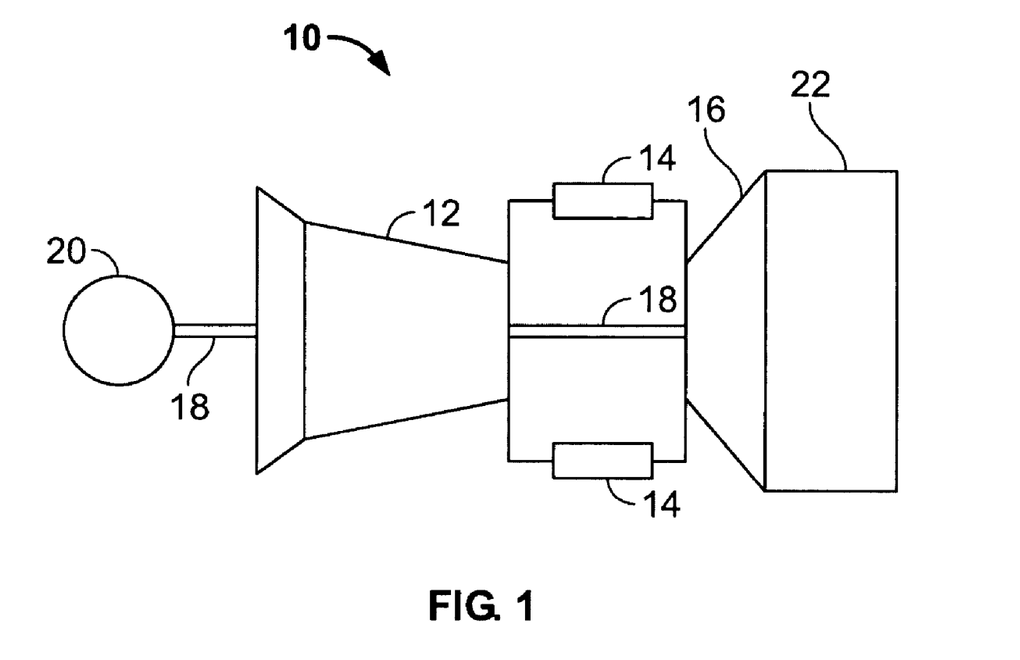
FIG. 1 is a schematic illustration of an exemplary gas turbine engine.

FIG. 1 is a schematic illustration of an exemplary gas turbine engine 10 including at least one compressor 12, a combustor 14, and a turbine 16 connected serially. Compressor 12 and turbine 16 are coupled by a shaft 18, which also couples turbine 16 and a driven load 20. In one embodiment, engine 10 is an 7FB engine commercially available from General Electric Company, Greenville, S.C. Engine 10 illustrated and described herein is exemplary only. Accordingly, engine 10 is not limited to the gas turbine engine shown in FIG. 1 and described herein, but rather, engine 10 may be any gas turbine engine. For example, in an alternative embodiment, engine 10 is a multi-shaft gas turbine engine having two turbines (not shown) for separately driving driven load 20 and compressor 12.

In operation, air flows into engine 10 through compressor 12 and is compressed. Compressed air is then channeled to combustor 14 where it is mixed with fuel and ignited. Airflow from combustor 14 drives rotating turbine 16 and exits gas turbine engine 10 through an exhaust nozzle 22. Additionally, in some embodiments exhaust gases from engine 10 may be supplied to a heat recovery steam generator (not shown in FIG. 1) that generates steam for driving a steam turbine (not shown in FIG. 1).

Figure 2:
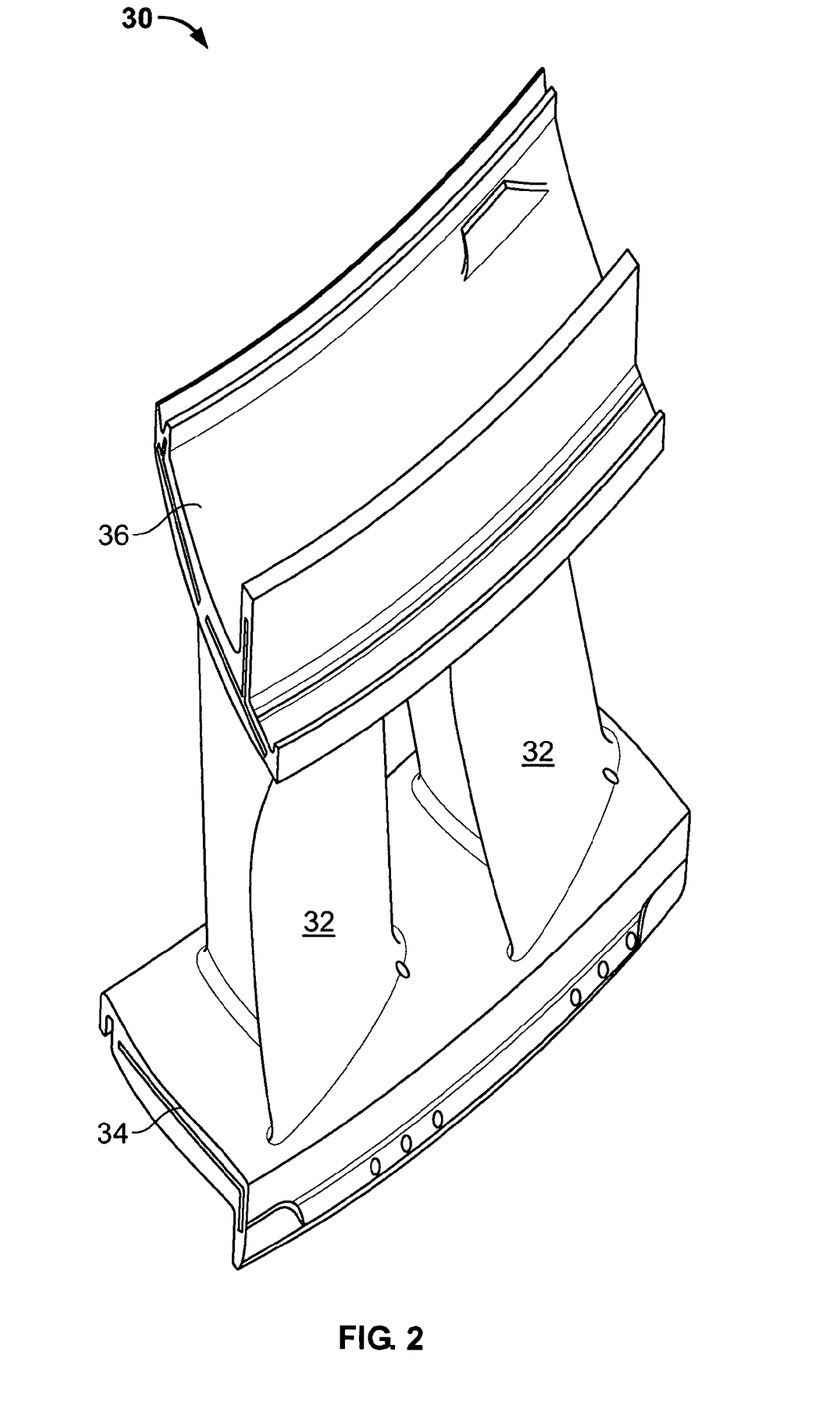
FIG. 2 is a perspective view of an exemplary turbine nozzle assembly for use in a gas turbine engine, such as the exemplary gas turbine engine shown in FIG. 1.

FIG. 2 is a perspective view of an exemplary turbine nozzle assembly 30 that may be used with a gas turbine engine, such as engine 10 (shown in FIG. 1). In the exemplary embodiment, nozzle assembly 30 includes two airfoils 32 and is generally known as a doublet. In such an embodiment, a plurality of turbine nozzle assemblies 30 are circumferentially coupled together to form a turbine nozzle ring. In the exemplary embodiment, doublet 30 includes a plurality of circumferentially-spaced airfoils 32 coupled together by an arcuate radially outer band or platform 34, and an arcuate radially inner band or platform 36. More specifically, in the exemplary embodiment, each band 34 and 36 is integrally-formed with airfoil 32, and each doublet 30 includes two airfoils 32. Turbine nozzle assembly 30 illustrated and described herein is exemplary only. Accordingly, turbine nozzle assembly 30 is not limited to the assembly shown in FIG. 2 and described herein, but rather, assembly 30 may be any turbine nozzle assembly. For example, in an alternative embodiment, turbine nozzle assembly 30 includes a single airfoil 32 and is generally known as a singlet. In yet another alternative embodiment, and for example, turbine nozzle assembly 30 includes three airfoils 32 and is generally known as a triplet.

Figure 3:
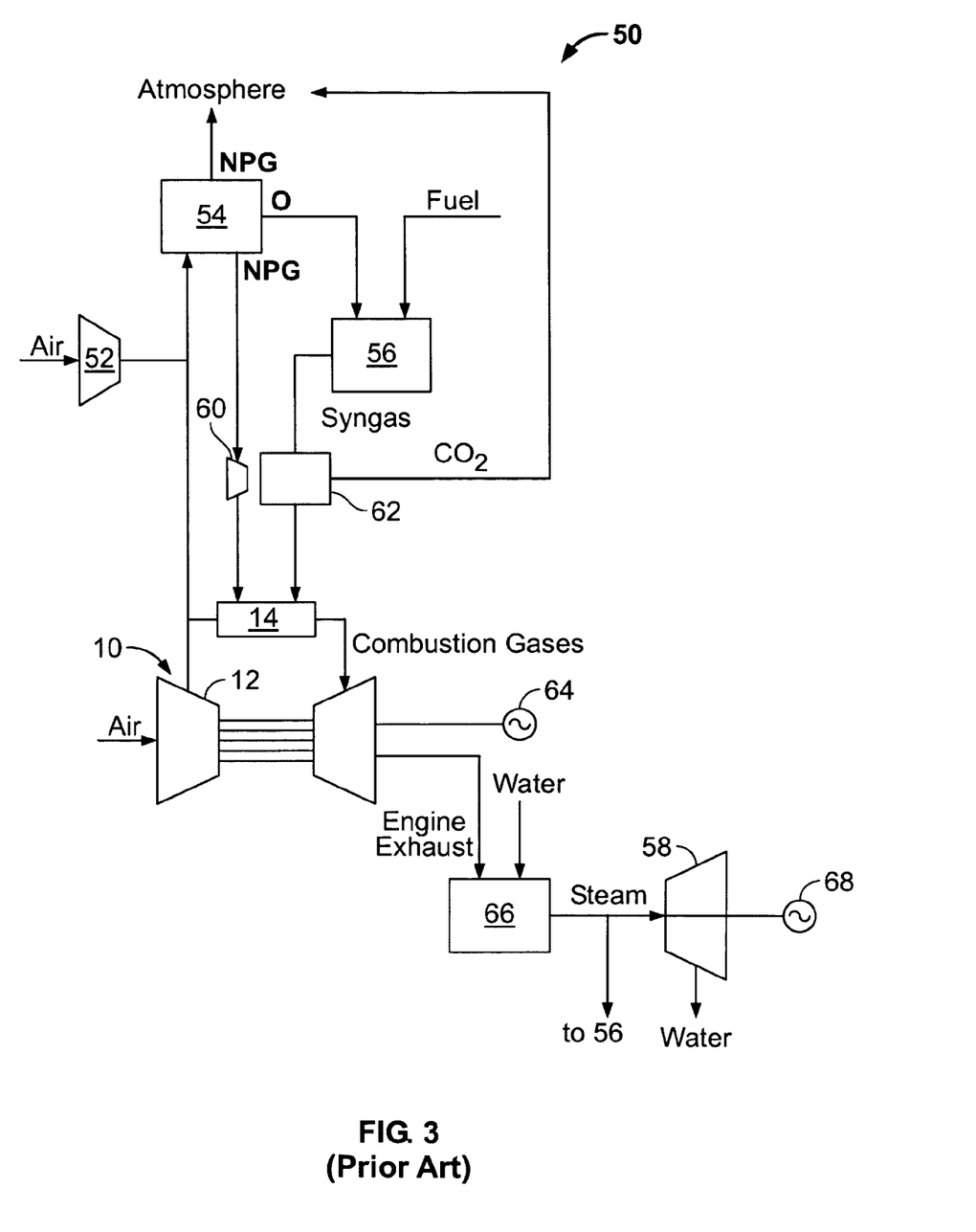
FIG. 3 is a schematic diagram of an exemplary known integrated gasification combined-cycle (IGCC) power generation system.

FIG. 3 is a schematic diagram of an exemplary known integrated gasification combined-cycle (IGCC) power generation system 50. IGCC system 50 generally includes a main air compressor 52, an air separation unit 54 coupled in flow communication to compressor 52, a gasifier 56 coupled in flow communication to air separation unit 54, a gas turbine engine, such as gas turbine engine 10, coupled in flow communication to gasifier 56, and a steam turbine 58. In operation, compressor 52 compresses ambient air. The compressed air is channeled to air separation unit 54. In some embodiments, in addition or alternative to compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas". The process gas generated by air separation unit 54 includes nitrogen and will be referred to herein as "nitrogen process gas". The nitrogen process gas may also include other gases such as, but not limited to, oxygen and/or argon. For example, in some embodiments, the nitrogen process gas includes between about 95% and about 100% nitrogen. The oxygen flow is channeled to gasifier 56 for use in generating partially combusted gases, referred to herein as "syngas" for use by gas turbine engine 10 as fuel, as described below in more detail. In some known IGCC systems 50, at least some of the nitrogen process gas flow, a by-product of air separation unit 54, is vented to the atmosphere. Moreover, in some known IGCC systems 50, some of the nitrogen process gas flow is injected into a combustion zone (not shown) within gas turbine engine combustor 14 to facilitate controlling emissions of engine 10, and more specifically to facilitate reducing the combustion temperature and reducing nitrous oxide emissions from engine 10. IGCC system 50 may include a compressor 60 for compressing the nitrogen process gas flow before being injected into the combustion zone.

Gasifier 56 converts a mixture of fuel, the oxygen supplied by air separation unit 54, steam, and/or limestone into an output of syngas for use by gas turbine engine 10 as fuel. Although gasifier 56 may use any fuel, in some known IGCC systems 50, gasifier 56 uses coal, petroleum coke, residual oil, oil emulsions, tarsands, and/or other similar fuels. In some known IGCC systems 50, the syngas generated by gasifier 56 includes carbon dioxide. The syngas generated by gasifier 52 may be cleaned in a clean-up device 62 before being channeled to gas turbine engine combustor 14 for combustion thereof. Carbon dioxide may be separated from the syngas during clean-up and, in some known IGCC systems 50, vented to the atmosphere. The power output from gas turbine engine 10 drives a generator 64 that supplies electrical power to a power grid (not shown). Exhaust gas from gas turbine engine 10 is supplied to a heat recovery steam generator 66 that generates steam for driving steam turbine 58. Power generated by steam turbine 58 drives an electrical generator 68 that provides electrical power to the power grid. In some known IGCC systems 50, steam from heat recovery steam generator 62 is supplied to gasifier 52 for generating the syngas.

Figure 4:
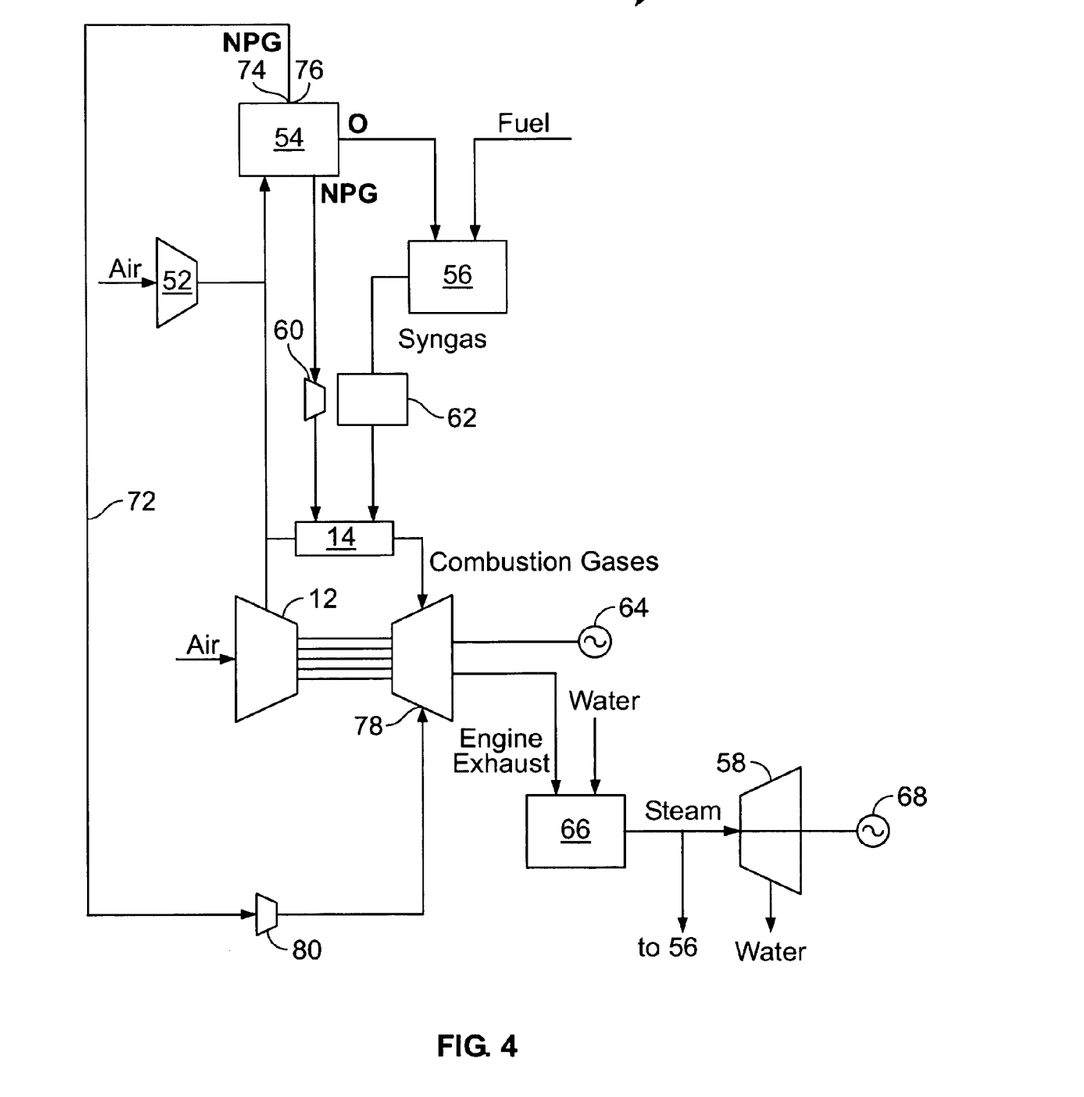
FIG. 4 is a schematic diagram of an exemplary embodiment of an IGCC power generation system of the present invention.

FIG. 4 is a schematic diagram of an exemplary embodiment of an integrated gasification combined-cycle (IGCC) power generation system 70 of the present invention. As described above, air separation unit 54 generates a flow of nitrogen process gas as a by-product of generating a flow of oxygen for gasifier 56. In some known IGCC systems, such as IGCC system 50 (shown in FIG. 3), at least some of the nitrogen process gas flow is vented to the atmosphere, which may be wasteful. For example, the nitrogen process gas vented to the atmosphere may represent a loss of energy from the IGCC system that could otherwise be utilized. Accordingly, IGCC system 70 uses at least some of the nitrogen process gas flow generated by air separation unit 54 to facilitate cooling a turbine nozzle assembly component of gas turbine engine 10, such as, in the exemplary embodiment, turbine nozzle assembly 30 (shown in FIG. 2). In other embodiments, and for example, at least some of the nitrogen process gas flow generated by air separation unit 54 may be used to facilitate cooling turbine assembly buckets (not shown) and/or may be used to facilitate purging turbine assembly wheelspaces (not shown). IGCC system 70 thereby facilitates cooling turbine nozzle assembly 30 using a cooling fluid (nitrogen process gas) extracted from a source external to gas turbine engine 10. More specifically, IGCC system 70 includes a conduit 72 having an end 74 that is coupled in flow communication to a nitrogen outlet 76 of air separation unit 54 that exhausts at least some of the nitrogen process gas flow from air separation unit 54. Another end 78 of conduit 72 is coupled in flow communication to gas turbine engine 10 adjacent turbine nozzle assembly 30. More specifically, conduit end 78 fluidly communicates with a cavity (not shown) within engine 10 containing turbine nozzle assembly 30. Accordingly, conduit 72 receives nitrogen process gas flow exhaust from air separation unit 54 through nitrogen outlet 76, and channels the nitrogen process gas flow into the gas turbine engine cavity for directing nitrogen process gas toward turbine nozzle assembly 30 to facilitate cooling assembly 30. In some embodiments, a compressor 80 is operatively connected to conduit 72 for compressing the nitrogen process gas flow before it is supplied to gas turbine engine 10. Moreover, in some embodiments, conduit 72 receives all of the nitrogen process gas generated by air separation unit 54 such that conduit 72 channels all of the nitrogen process gas generated by air separation unit 54 to turbine nozzle assembly 30. In other embodiments, some of the nitrogen process gas generated by air separation unit 54 is channeled to combustor 14 for controlling emissions of engine 10 and/or is vented to the atmosphere.

By using the nitrogen process gas flow that may otherwise be wasted by being vented to the atmosphere, IGCC system 70 may facilitate reducing parasitic energy losses experienced by system 70. Moreover, because the nitrogen process gas flow exits air separation unit 54 at about ambient temperature and at least a substantial portion of conduit 72 is external to gas turbine engine 10, a temperature of the nitrogen process gas flow can be heated/controlled to any desired temperature and may thereby facilitate allowing a reduction of the flow rate of the cooling flow that may be required to cool turbine nozzle assembly 30. In some known IGCC systems and/or gas turbine engines, turbine nozzle assembly 30 is cooled using compressed air extracted from a compressor stage of engine 10. IGCC system 70 may cool turbine nozzle assembly 30 using nitrogen process gas from air separation unit 54 in addition or alternative to cooling via compressor extraction air. Accordingly, in some embodiments, conduit 72 may facilitate increasing an overall amount of cooling of turbine nozzle assembly 30 if both nitrogen process gas from air separation unit 54 and compressor extraction air are used to cool turbine nozzle assembly 30. Moreover, in some embodiments, conduit 72 may facilitate decreasing, or eliminating entirely, an amount of compressor extraction air used to cool turbine nozzle assembly 30, which may facilitate increasing an amount of oxygen supplied gas turbine engine combustor 14 from gas turbine engine compressor 14.

Figure 5:
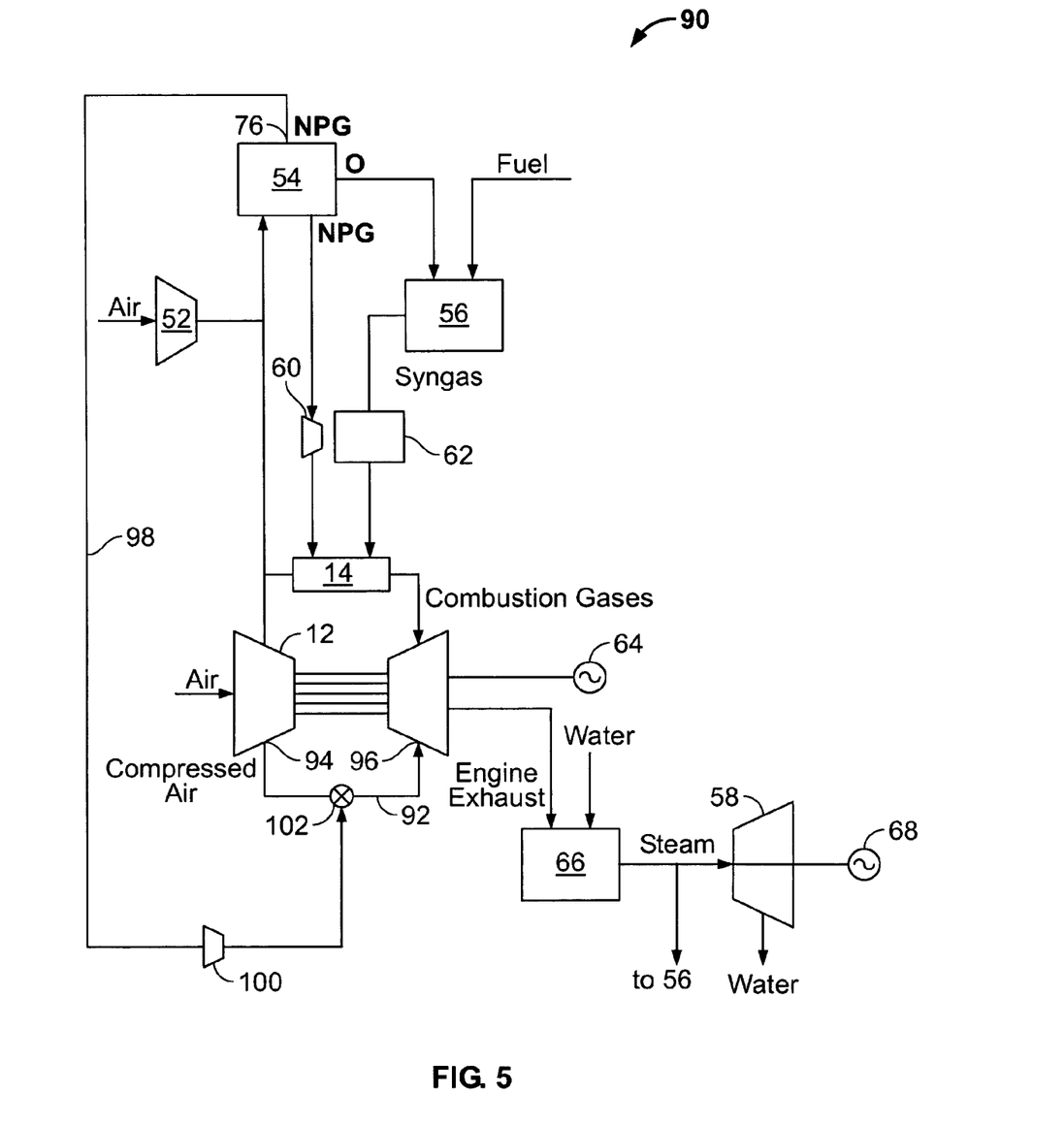
FIG. 5 is a schematic diagram of an alternative embodiment of the IGCC system shown in FIG. 4.

FIG. 5 is a schematic diagram of an exemplary embodiment of an IGCC power generation system 90 that is an alternative embodiment of IGCC system 70 (shown in FIG. 4). As described above, in some known IGCC systems and/or gas turbine engines, turbine nozzle assembly 30 is cooled using compressed air extracted from a compressor stage of engine 10. Specifically, in some known IGCC systems and/or gas turbine engines, a pipe 92 is coupled in flow communication to gas turbine engine 10 adjacent gas turbine engine compressor 12 and adjacent turbine nozzle assembly 30 (shown in FIG. 2). More specifically, an end 94 of pipe 92 is coupled in flow communication to a cavity (not shown) of gas turbine engine 10 containing engine compressor 12 and an opposing end 96 of pipe 92 is coupled in flow communication to a cavity (not shown) of engine 10 containing turbine nozzle assembly 30. Pipe 92 channels compressed air extracted from a compressor stage of engine compressor 12 to turbine nozzle assembly 30 for cooling thereof.

In the exemplary embodiment of IGCC system 90, a conduit 98 is coupled in flow communication to nitrogen outlet 76 of air separation unit 54 that exhausts at least some of the nitrogen process gas flow from air separation unit 54. Conduit 98 is also coupled in flow communication to pipe 92. Accordingly, conduit 98 receives nitrogen process gas flow exhaust from air separation unit 54 through nitrogen outlet 76, and channels the nitrogen process gas flow into pipe 92, which channels the nitrogen process gas flow into the gas turbine engine cavity containing assembly 30 for directing nitrogen process gas toward turbine nozzle assembly 30 to facilitate cooling assembly 30. In some embodiments, a compressor 100 is operatively connected to conduit 98 for compressing the nitrogen process gas flow before it is supplied to gas turbine engine 10. Moreover, in some embodiments, a valve 102 is operatively connected at the fluid interconnection between pipe 92 and conduit 98 for selectively controlling an amount of the nitrogen process gas flow released into pipe 92. In some embodiments, conduit 98 receives all of the nitrogen process gas generated by air separation unit 54 such that conduit 98 channels all of the nitrogen process gas generated by air separation unit 54 to turbine nozzle assembly 30. In other embodiments, some of the nitrogen process gas generated by air separation unit 54 is channeled to combustor 14 for controlling emissions of engine 10 and/or is vented to the atmosphere.

By using the nitrogen process gas flow that may otherwise be wasted by being vented to the atmosphere, IGCC system 90 may facilitate reducing parasitic energy losses experienced by system 90. Moreover, because the nitrogen process gas flow exits air separation unit 54 at about ambient temperature and at least a substantial portion of conduit 98 is external to gas turbine engine 10, a temperature of the nitrogen process gas flow can be heated/controlled to any desired temperature and may thereby facilitate allowing a reduction of the flow rate of the cooling flow that may be required to cool turbine nozzle assembly 30. IGCC system 90 may cool turbine nozzle assembly 30 using nitrogen process gas from air separation unit 54 in addition or alternative to cooling via compressor extraction air. Accordingly, in some embodiments, conduit 98 may facilitate increasing an overall amount of cooling of turbine nozzle assembly 30 if both nitrogen process gas from air separation unit 54 and compressor extraction air are used to cool turbine nozzle assembly 30. Moreover, in some embodiments, conduit 98 may facilitate decreasing, or eliminating entirely (despite using pipe 92 to ultimately supply nitrogen process gas to assembly 30), an amount of compressor extraction air used to cool turbine nozzle assembly 30, which may facilitate increasing an amount of oxygen supplied gas turbine engine combustor 14 from gas turbine engine compressor 14.

Figure 6:
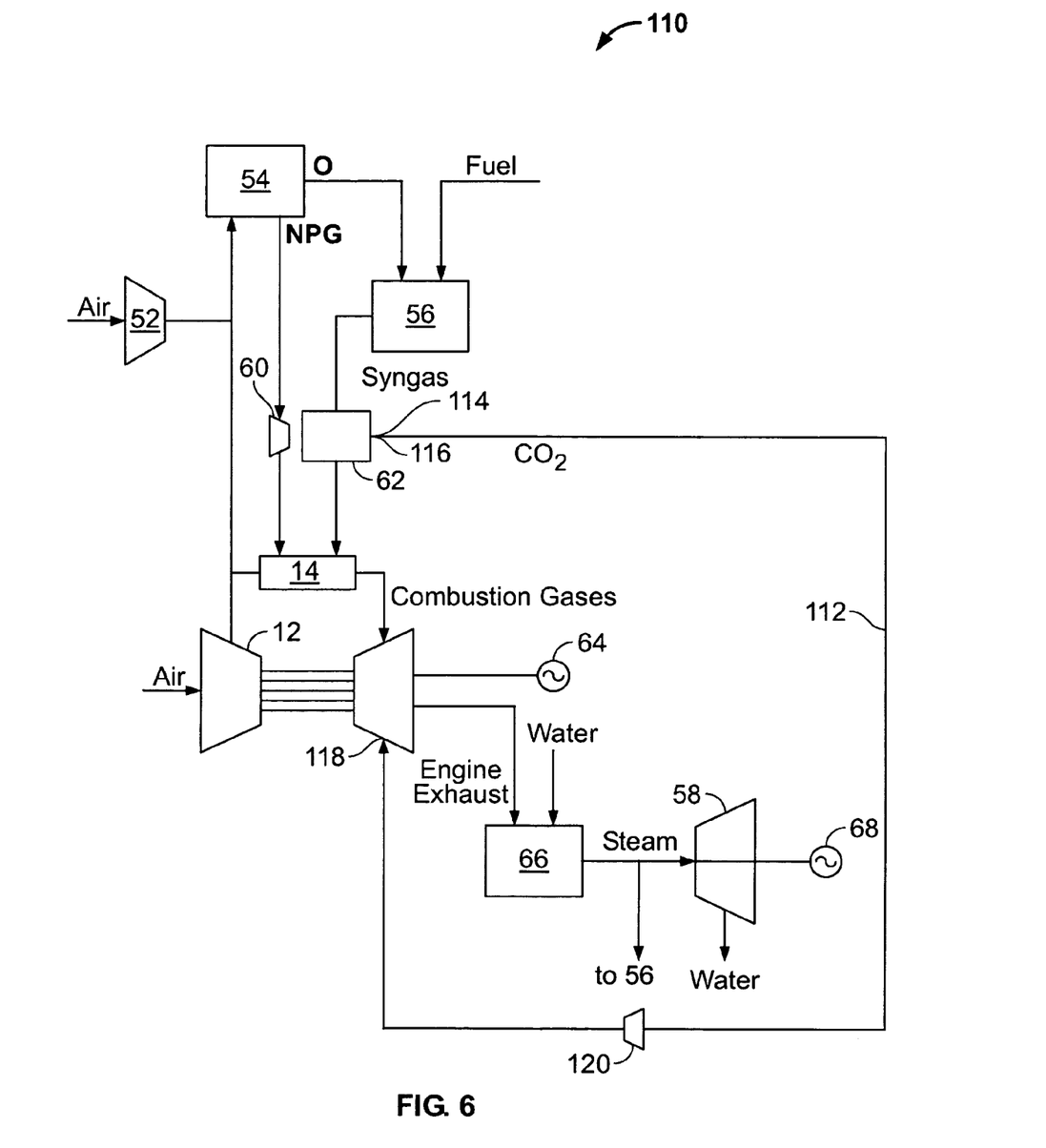
FIG. 6 is a schematic diagram of a further alternative embodiment of the IGCC system of the present invention.

FIG. 6 is a schematic diagram of a further alternative embodiment of an integrated gasification combined-cycle (IGCC) power generation system 110 of the present invention. As described above, clean-up device 62 produces an exhaust of carbon dioxide. In some known IGCC systems, such as IGCC system 50 (shown in FIG. 3), at least some of the carbon dioxide flow is vented to the atmosphere, which may be wasteful. For example, the carbon dioxide vented to the atmosphere may represent a loss of energy from the IGCC system that could otherwise be utilized. Accordingly, IGCC system 110 uses at least some of the carbon dioxide flow generated by clean-up device 62 to facilitate cooling a turbine assembly component of gas turbine engine 10, such as, in the exemplary embodiment, turbine nozzle assembly 30 (shown in FIG. 2). In other embodiments, and for example, at least some of the carbon dioxide flow generated by clean-up device 62 may be used to facilitate cooling turbine assembly buckets (not shown) and/or may be used to facilitate purging turbine assembly wheelspaces (not shown). IGCC system 110 thereby facilitates cooling turbine nozzle assembly 30 using a cooling fluid (carbon dioxide) extracted from a source external to gas turbine engine 10. More specifically, IGCC system 110 includes a conduit 112 having an end 114 that is coupled in flow communication to a carbon dioxide outlet 116 of clean-up device 62 that exhausts at least some of the carbon dioxide flow from clean-up device 62. Another end 118 of conduit 102 is coupled in flow communication to gas turbine engine 10 adjacent turbine nozzle assembly 30. More specifically, conduit end 118 fluidly communicates with a cavity (not shown) within engine 10 containing turbine nozzle assembly 30. Accordingly, conduit 112 receives carbon dioxide flow exhaust from clean-up device 62 through carbon dioxide outlet 116, and channels the carbon dioxide flow into the gas turbine engine cavity for directing carbon dioxide toward turbine nozzle assembly 30 to facilitate cooling assembly 30. In some embodiments, a compressor 120 is operatively connected to conduit 112 for compressing the carbon dioxide flow before it is supplied to gas turbine engine 10. Moreover, in some embodiments, conduit 112 receives all of the carbon dioxide generated by clean-up device 62 such that conduit 112 channels all of the nitrogen generated by clean-up device 62 to turbine nozzle assembly 30. In other embodiments, some of the carbon dioxide generated by clean-up device 62 is vented to the atmosphere.

By using the carbon dioxide flow that may otherwise be wasted by being vented to the atmosphere, IGCC system 110 may facilitate reducing parasitic energy losses experienced by system 110. Moreover, because the carbon dioxide flow exits clean-up device 62 at about ambient temperature and at least a substantial portion of conduit 112 is external to gas turbine engine 10, a temperature of the carbon dioxide flow can be heated/controlled to any desired temperature and may thereby facilitate allowing a reduction of the flow rate of the cooling flow that may be required to cool turbine nozzle assembly 30. As discussed above, in some known IGCC systems and/or gas turbine engines, turbine nozzle assembly 30 is cooled using compressed air extracted from a compressor stage of engine 10. IGCC system 110 may cool turbine nozzle assembly 30 using carbon dioxide from clean-up device in addition or alternative to cooling via compressor extraction air. Accordingly, in some embodiments, conduit 112 may facilitate increasing an overall amount of cooling of turbine nozzle assembly 30 if both carbon dioxide from clean-up device and compressor extraction air are used to cool turbine nozzle assembly 30. Moreover, in some embodiments, conduit 112 may facilitate decreasing, or eliminating entirely, an amount of compressor extraction air used to cool turbine nozzle assembly 30, which may facilitate increasing an amount of oxygen supplied gas turbine engine combustor 14 from gas turbine engine compressor 14.

Figure 7:
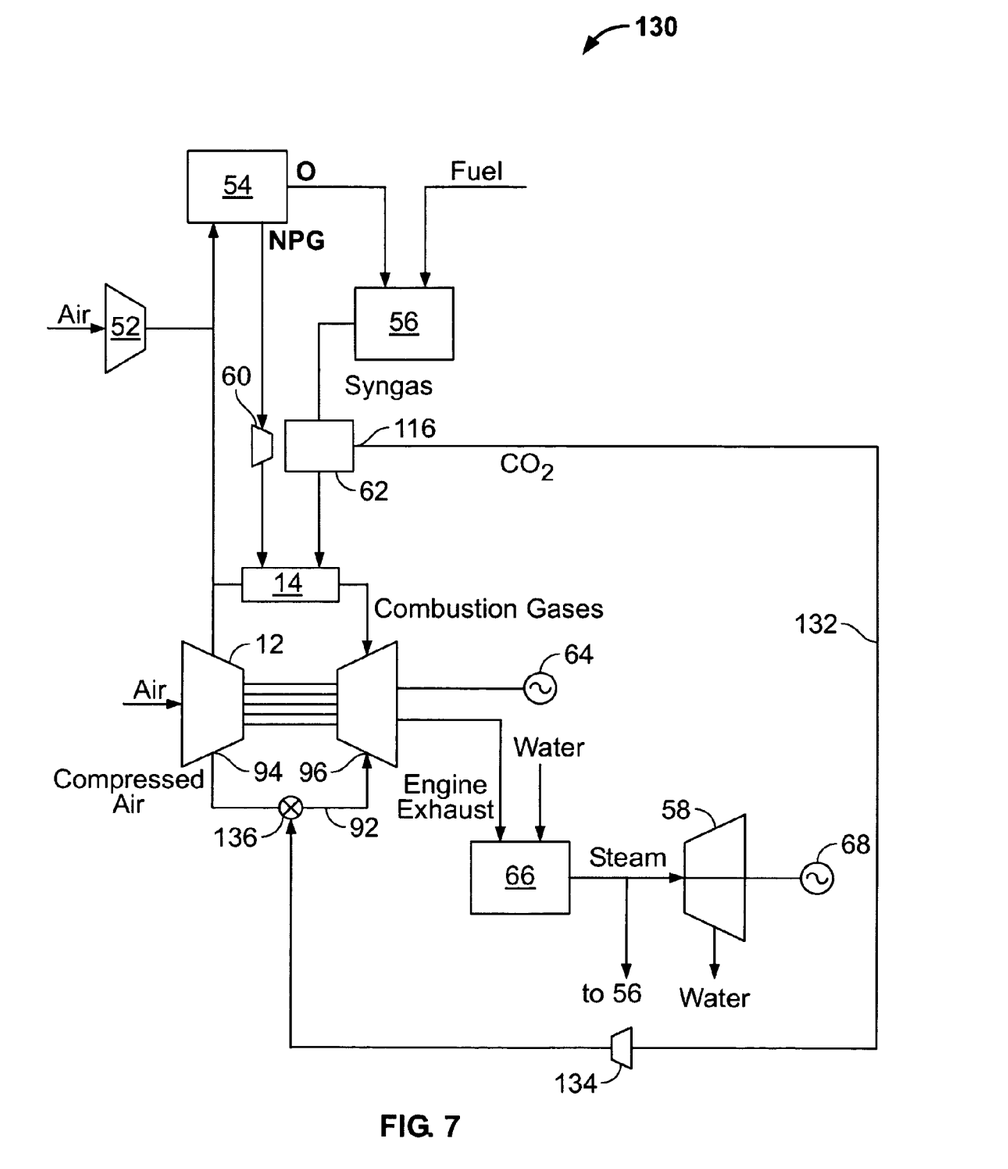
FIG. 7 is a schematic diagram of an alternative embodiment of the IGCC system shown in FIG. 6.

FIG. 7 is a schematic diagram of an exemplary embodiment of an IGCC power generation system 130 that is an alternative embodiment of IGCC system 110 (shown in FIG. 6). In the exemplary embodiment of IGCC system 130, a conduit 132 is coupled in flow communication to carbon dioxide outlet 116 of clean-up device 62 that exhausts at least some of the carbon dioxide flow from device 62. Conduit 132 is also coupled in flow communication to pipe 92. Accordingly, conduit 132 receives carbon dioxide flow exhaust from clean-up device 62 through carbon dioxide outlet 116, and channels the carbon dioxide flow into pipe 92, which channels the carbon dioxide flow into the gas turbine engine cavity containing assembly 30 for directing carbon dioxide toward turbine nozzle assembly 30 to facilitate cooling assembly 30. In some embodiments, a compressor 134 is operatively connected to conduit 132 for compressing the carbon dioxide flow before it is supplied to gas turbine engine 10. Moreover, in some embodiments, a valve 136 is operatively connected at the fluid interconnection between pipe 92 and conduit 132 for selectively controlling an amount of the carbon dioxide flow released into pipe 92. In some embodiments, conduit 132 receives all of the carbon dioxide generated by clean-up device 62 such that conduit 132 channels all of the carbon dioxide generated by clean-up device 62 to turbine nozzle assembly 30. In other embodiments, some of the carbon dioxide generated by clean-up device 62 is vented to the atmosphere.

By using the carbon dioxide flow that may otherwise be wasted by being vented to the atmosphere, IGCC system 130 may facilitate reducing parasitic energy losses experienced by system 130. Moreover, because the carbon dioxide flow exits clean-up device 62 at about ambient temperature and at least a substantial portion of conduit 132 is external to gas turbine engine 10, a temperature of the carbon dioxide flow can be heated/controlled to any desired temperature and may thereby facilitate allowing a reduction of the flow rate of the cooling flow that may be required to cool turbine nozzle assembly 30. IGCC system 130 may cool turbine nozzle assembly 30 using carbon dioxide from clean-up device 62 in addition or alternative to cooling via compressor extraction air. Accordingly, in some embodiments, conduit 132 may facilitate increasing an overall amount of cooling of turbine nozzle assembly 30 if both carbon dioxide from clean-up device 62 and compressor extraction air are used to cool turbine nozzle assembly 30. Moreover, in some embodiments, conduit 132 may facilitate decreasing, or eliminating entirely (despite using pipe 92 to ultimately supply carbon dioxide to assembly 30), an amount of compressor extraction air used to cool turbine nozzle assembly 30, which may facilitate increasing an amount of oxygen supplied gas turbine engine combustor 14 from gas turbine engine compressor 14.

Although the systems and methods described and/or illustrated herein are described and/or illustrated with respect to cooling a turbine nozzle assembly for a gas turbine engine, practice of the systems and methods described and/or illustrated herein is not limited to turbine nozzle assemblies. Rather, the systems and methods described and/or illustrated herein are applicable to cooling any component of a gas turbine engine turbine assembly.

Exemplary embodiments of systems and methods are described and/or illustrated herein in detail. The systems and methods are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the systems and methods described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for cooling a turbine assembly component of a gas turbine engine in a combined-cycle power generation system, said method comprising:
    separating nitrogen process gas and oxygen from air using an air separation unit;
    channeling cooling fluid that is extracted from a compressor and nitrogen process gas that is extracted from the air separation unit to a valve coupled to the compressor and to the air separation unit, wherein the valve controls at least one of the flow of cooling fluid and nitrogen process gas to the turbine assembly component; and
    cooling the turbine assembly component using at least one of the cooling fluid and the nitrogen process gas.

2. A method in accordance with claim 1 wherein channeling cooling fluid comprises channeling the cooling fluid and nitrogen process gas to a turbine nozzle assembly of the turbine assembly.

3. A method in accordance with claim 1 wherein channeling cooling fluid comprises channeling the cooling fluid and nitrogen process gas through a pipe that is coupled in flow communication to the gas turbine engine adjacent the compressor of the gas turbine engine and that is coupled in flow communication to the gas turbine engine adjacent the turbine assembly.

4. A combined-cycle power generation system comprising:
    a gas turbine engine comprising a compressor and a turbine assembly;
    an air separation unit configured to separate oxygen and nitrogen process gas from air to thereby generate a flow of nitrogen process gas and a flow of oxygen, said air separation unit comprising a nitrogen outlet that exhausts nitrogen process gas from said air separation unit;
    a conduit coupled in flow communication to said nitrogen outlet, said conduit configured to channel nitrogen process gas discharged from said nitrogen outlet; and
    a valve coupled in flow communication to a downstream end of said conduit and said compressor, said valve configured to control a flow of nitrogen process gas and air discharged from at least one of said conduit and said compressor to said turbine assembly to facilitate cooling a component within said turbine assembly.

5. A system in accordance with claim 4 wherein said turbine assembly component comprises a turbine nozzle assembly.

6. A system in accordance with claim 4 further comprising a pipe coupled in flow communication to said gas turbine engine adjacent said compressor of said gas turbine engine, said pipe configured to channel extraction air from said compressor to said turbine assembly component, said conduit coupled in flow communication to said pipe between said gas turbine engine compressor and said turbine assembly component.

7. A system in accordance with claim 4 further comprising a gasifier configured to generate fuel for use by said gas turbine engine, said gasifier coupled in flow communication to said gas turbine engine.

8. A system in accordance with claim 4 further comprising:

a steam turbine; and a heat recovery steam generator coupled to said gas turbine engine and said steam turbine, said heat recovery steam generator configured to generate steam using exhaust gas received from said gas turbine engine, said heat recovery steam generator further configured to discharge steam to said steam turbine.

9. A system in accordance with claim 4 wherein said air separation unit is configured to generate a flow of nitrogen process gas comprising between about 95% and 100% nitrogen.

* * * * *

UNITED STATES PATENT AND TRADEMARK OFFICE
CERTIFICATE OF CORRECTION

PATENT NO. : 7,581,401 B2 Page 1 of 1
APPLICATION NO. : 11/227600
DATED : September 1, 2009
INVENTOR(S) : West et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 310 days.

Signed and Sealed this

Fourteenth Day of September, 2010

David J. Kappos
*Director of the United States Patent and Trademark Office*